(12) United States Patent
Settemsdal

(10) Patent No.: US 9,381,990 B2
(45) Date of Patent: Jul. 5, 2016

(54) POWER SUPPLY SYSTEM FOR AN ELECTRICAL DRIVE OF A MARINE VESSEL

(75) Inventor: Stig Olav Settemsdal, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 187 days.

(21) Appl. No.: 13/983,170

(22) PCT Filed: Jan. 19, 2012

(86) PCT No.: PCT/EP2012/050803
§ 371 (c)(1),
(2), (4) Date: Aug. 1, 2013

(87) PCT Pub. No.: WO2012/104152
PCT Pub. Date: Aug. 9, 2012

(65) Prior Publication Data
US 2013/0307444 A1    Nov. 21, 2013

(30) Foreign Application Priority Data

Feb. 1, 2011 (EP) .................................. 11152944
May 24, 2011 (EP) .................................. 11167247

(51) Int. Cl.
*H02P 1/00* (2006.01)
*B63H 21/17* (2006.01)
(Continued)

(52) U.S. Cl.
CPC . *B63H 21/17* (2013.01); *B60L 7/14* (2013.01); *B60L 7/16* (2013.01); *B63H 23/24* (2013.01);
(Continued)

(58) Field of Classification Search
CPC .......... B66B 1/30; B66B 1/285; B66B 1/308; B66B 1/302; B66B 5/027; B66B 5/02; B66B 1/2458; B66B 2201/102; B66B 2201/211; B66B 2201/216; B66B 2201/222; B66B 2201/235; B66B 2201/243; H02J 7/34; H02J 3/32; H02J 3/34; H02J 4/00; H02J 7/00; H02J 7/0055; H02J 7/007; H02J 7/0078; H02J 7/02; H02J 9/062; H02P 23/06; H02P 23/08; H02P 3/18
USPC .................. 318/139, 360–376; 187/290, 296; 290/42, 53
See application file for complete search history.

(56) References Cited

U.S. PATENT DOCUMENTS 3,961,688 A * 6/1976 Maynard ........................ 187/289
4,475,631 A * 10/1984 Nomura ........................ 187/296
(Continued)

FOREIGN PATENT DOCUMENTS

CN    1419517 A    5/2003    ............... B66B 1/30
CN    101675206 A    3/2010    ............. E21B 15/00
(Continued)

OTHER PUBLICATIONS

Chinese Office Action, Application No. 201280007303.5, 14 pages, Nov. 19, 2014.
(Continued)

*Primary Examiner* — Paul Ip
(74) *Attorney, Agent, or Firm* — Slayden Grubert Beard PLLC

(57) ABSTRACT

A power supply system for an electrical drive of a marine vessel is provided. The electrical drive includes an electric motor that is adapted to receive electric energy from a power source. The electrical drive has a first operating state in which electric energy is supplied by the power source to the electrical drive to operate the electrical drive and a second operating state in which the electric motor of the electrical drive is decelerated or braked, wherein the electrical drive generates electric energy in the second operating state. The power supply system comprises an electric energy storage device for storing generated electric energy.

13 Claims, 3 Drawing Sheets

(51) Int. Cl.

| | |
|---|---|
| *B60L 7/14* | (2006.01) |
| *B60L 7/16* | (2006.01) |
| *B63H 23/24* | (2006.01) |
| *H02J 3/32* | (2006.01) |
| *H02J 4/00* | (2006.01) |
| *B63J 3/02* | (2006.01) |
| *B63J 3/00* | (2006.01) |
| *B63J 3/04* | (2006.01) |

(52) U.S. Cl.
CPC .... *B63J 3/02* (2013.01); *H02J 3/32* (2013.01); *H02J 4/00* (2013.01); *B63J 2003/002* (2013.01); *B63J 2003/046* (2013.01); *Y02E 60/721* (2013.01); *Y02T 70/70* (2013.01); *Y04S 10/126* (2013.01)

(56) References Cited

U.S. PATENT DOCUMENTS

| | | | | |
|---|---|---|---|---|
| 4,516,665 | A * | 5/1985 | Watanabe | 187/296 |
| 4,554,999 | A * | 11/1985 | Kamaike | 187/290 |
| 4,713,595 | A * | 12/1987 | Yonemoto | 318/759 |
| 4,741,415 | A * | 5/1988 | Nomura | 187/296 |
| 4,749,932 | A * | 6/1988 | Yonemoto | 318/759 |
| 5,070,290 | A * | 12/1991 | Iwasa et al. | 318/758 |
| 5,241,255 | A * | 8/1993 | Oshima et al. | 318/801 |
| 5,285,029 | A * | 2/1994 | Araki | 187/290 |
| 6,163,472 | A * | 12/2000 | Colby | 363/127 |
| 6,439,347 | B2 * | 8/2002 | Suga et al. | 187/290 |
| 6,454,053 | B2 * | 9/2002 | Tominaga et al. | 187/290 |
| 6,457,565 | B2 * | 10/2002 | Tominaga et al. | 187/290 |
| 6,460,658 | B2 * | 10/2002 | Suga et al. | 187/290 |
| 6,471,013 | B2 * | 10/2002 | Banno et al. | 187/290 |
| 6,522,099 | B2 * | 2/2003 | Tominaga et al. | 318/801 |
| 6,533,074 | B2 * | 3/2003 | Tominaga et al. | 187/290 |
| 6,710,574 | B2 * | 3/2004 | Davis et al. | 318/800 |
| 6,742,630 | B2 | 6/2004 | Eilinger | 187/290 |
| 6,827,182 | B2 * | 12/2004 | Araki | 187/290 |
| 7,544,108 | B2 | 6/2009 | Rzadki et al. | 440/6 |
| 7,588,125 | B2 * | 9/2009 | Ueda et al. | 187/293 |
| 7,633,248 | B1 * | 12/2009 | Williams | 318/150 |
| 7,658,268 | B2 * | 2/2010 | Kinpara et al. | 187/293 |
| 7,931,128 | B2 * | 4/2011 | Sakai et al. | 187/293 |
| 8,127,894 | B2 * | 3/2012 | Agirman et al. | 187/290 |
| 8,177,032 | B2 * | 5/2012 | Hashimoto | 187/290 |
| 8,546,976 | B2 * | 10/2013 | Sannino et al. | 307/38 |
| 8,575,869 | B2 * | 11/2013 | Kallioniemi et al. | 318/106 |
| 8,960,371 | B2 * | 2/2015 | Schoenauer et al. | 187/290 |
| 8,973,731 | B2 * | 3/2015 | Ma | 198/323 |
| 2001/0017234 | A1 * | 8/2001 | Suga et al. | 187/290 |
| 2001/0017235 | A1 * | 8/2001 | Suga et al. | 187/290 |
| 2001/0017236 | A1 * | 8/2001 | Tominaga et al. | 187/290 |
| 2001/0017239 | A1 * | 8/2001 | Tajima et al. | 187/290 |
| 2001/0017242 | A1 * | 8/2001 | Tajima et al. | 187/296 |
| 2002/0053490 | A1 * | 5/2002 | Banno et al. | 187/290 |
| 2002/0179376 | A1 * | 12/2002 | Tominaga et al. | 187/290 |
| 2002/0189906 | A1 * | 12/2002 | Tominaga et al. | 187/290 |
| 2003/0057916 | A1 * | 3/2003 | Davis et al. | 318/800 |
| 2004/0035646 | A1 * | 2/2004 | Araki | 187/290 |
| 2007/0084673 | A1 * | 4/2007 | Smith et al. | 187/290 |
| 2007/0227828 | A1 * | 10/2007 | Kinpara et al. | 187/295 |
| 2007/0284196 | A1 * | 12/2007 | Sakai et al. | 187/305 |
| 2008/0048497 | A1 * | 2/2008 | Donnelly et al. | 307/19 |
| 2008/0182466 | A1 | 7/2008 | Wegner-Donnelly et al. | 440/84 |
| 2008/0315802 | A1 * | 12/2008 | Ueda et al. | 318/3 |
| 2009/0014252 | A1 * | 1/2009 | Vedula et al. | 187/290 |
| 2009/0284228 | A1 | 11/2009 | Kumar | 320/137 |
| 2009/0301819 | A1 * | 12/2009 | Agirman et al. | 187/290 |
| 2010/0000825 | A1 * | 1/2010 | Smith et al. | 187/393 |
| 2010/0044160 | A1 * | 2/2010 | Agirman et al. | 187/290 |
| 2010/0078267 | A1 * | 4/2010 | Hashimoto | 187/296 |
| 2010/0314168 | A1 * | 12/2010 | Williams | 175/5 |
| 2011/0074165 | A1 | 3/2011 | Grimes et al. | 290/40 C |
| 2011/0298283 | A1 * | 12/2011 | Sannino et al. | 307/38 |
| 2012/0010751 | A1 * | 1/2012 | Kallioniemi et al. | 700/275 |
| 2012/0055742 | A1 * | 3/2012 | Takeda | 187/382 |
| 2012/0085593 | A1 * | 4/2012 | Schoenauer et al. | 187/254 |
| 2012/0111670 | A1 * | 5/2012 | Fargo et al. | 187/247 |
| 2012/0261217 | A1 * | 10/2012 | Agirman et al. | 187/290 |
| 2014/0210398 | A1 * | 7/2014 | Powell et al. | 320/104 |

FOREIGN PATENT DOCUMENTS

| | | | | |
|---|---|---|---|---|
| EP | 1614621 | A2 | 1/2006 | B63H 21/17 |
| GB | 2318000 | A | 4/1998 | H02J 9/06 |
| WO | 2005/049418 | A2 | 6/2005 | H02J 4/00 |
| WO | 2007/067064 | A1 | 6/2007 | B63H 23/24 |
| WO | 2010/132065 | A1 | 11/2010 | E02F 9/20 |
| WO | 2012/104151 | A2 | 8/2012 | H02J 9/06 |
| WO | 2012/104152 | A2 | 8/2012 | B60L 7/14 |

OTHER PUBLICATIONS

International Search Report and Written Opinion, Application No. PCT/EP2012/050803, 11 pages, Mar. 18, 2013.

International Search Report and Written Opinion, Application No. PCT/EP2012/050802, 10 pages, Mar. 26, 2013.

* cited by examiner

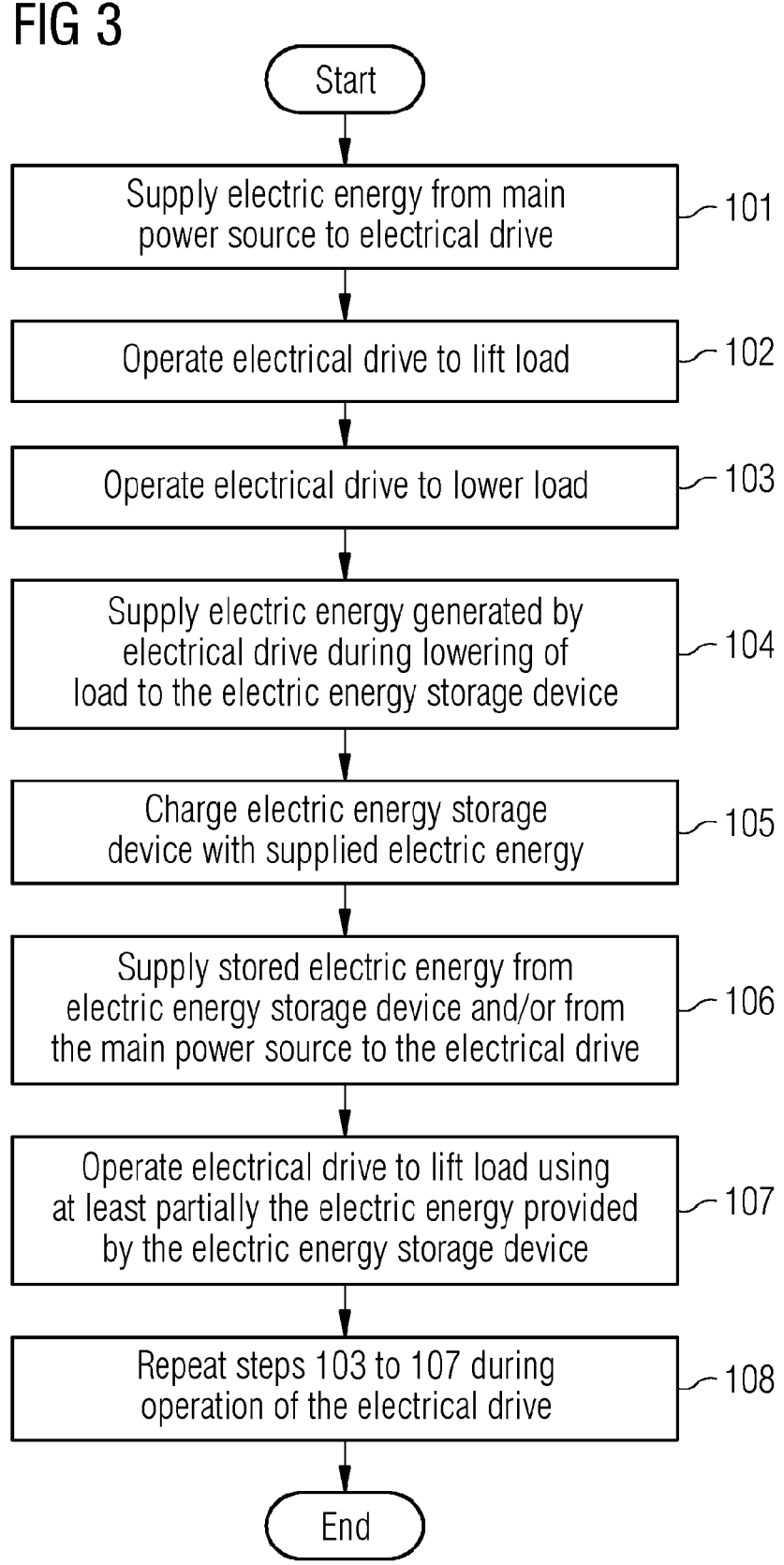

US 9,381,990 B2

POWER SUPPLY SYSTEM FOR AN ELECTRICAL DRIVE OF A MARINE VESSEL

CROSS-REFERENCE TO RELATED APPLICATIONS

This application is a U.S. National Stage Application of International Application No. PCT/EP2012/050803 filed Jan. 19, 2012, which designates the United States of America, and claims priority to EP Patent Application No. 11152944.2 filed Feb. 1, 2011 and EP Patent Application No. 11167247.3 filed May 24, 2011. The contents of which are hereby incorporated by reference in their entirety.

TECHNICAL FIELD

This disclosure relates to a power supply system for an electrical drive of a marine vessel and to a method of operating such power supply system.

BACKGROUND

Modern marine vessels that are for example employed in drilling operations often comprise a plurality of different electrical drives. These may for example be electric propulsion systems in which propellers are driven by electrical motors, such as Azimuth thrusters. Other types of electrical drives that require electric energy for operation include anchor winch drives, drives of drilling applications and the like. Electricity is generally produced on board and transmitted to the electric motor of the respective electrical drive.

For generating electric energy, marine vessels often comprise an on board power plant which produces the required electric energy by means of a diesel engine or a gas turbine coupled to a generator. Such arrangements provide the main power supply for the vessel. If the power plant experiences a blackout, or if there is a fault in the power transmission or distribution system, the vessel can loose its main power supply.

In case of such black out or another type of power loss, the electric drives will generally be disconnected and cease operation. For example in a hoisting application, such as the drawworks of a drilling rig or an anchor winch drive, brakes must be applied to the rotating motors and the operation will stop.

Furthermore, in such applications, energy may be generated by the respective electric motors during a hoisting operation, e.g. while lowering or stopping a load. The generated energy needs to be handled. This is generally performed by making use of water cooled braking resistors that burn off the energy. Drawwork motors, anchor winch motors, top drive motors or the like may for example have a drive setup with breaking choppers and resistors which burn off the braking energy generated by the motors. The problem of handling the braking energy is even more pronounced in system which comprise an active heave compensation, such as an active heave compensated drawworks on a drilling rig, in which braking energy is generated during the lowering operation for compensating the wave heights of the sea. The braking energy has to be handled in a more rapid fashion and is generally also burned off in braking resistors.

The water cooled braking resistors are generally heavy and require a substantial amount of space, while not having any further useful function. Furthermore, for example during active heave compensation, periodic peaks in the power consumption occur which is unfavorable as they result in a cyclic operation of the generators. Peaks in the energy consumption make the operation of the generators less efficient and furthermore require the power supply system of the marine vessel to be designed for larger loads. Furthermore, it is generally desirable to reduce the energy consumption of the marine vessel. Also, it is desirable to continue operation of the electrical drive for at least a short amount of time after a blackout of the power supply.

SUMMARY

One embodiment provides a power supply system for an electrical drive of a marine vessel, wherein the electrical drive comprises an electric motor that is adapted to receive electric energy from a power source, wherein the electrical drive has a first operating state in which electric energy is supplied by the power source to the electrical drive to operate the electrical drive and a second operating state in which the electric motor of the electrical drive is decelerating or braked, wherein the electrical drive generates electric energy in the second operating state, the power supply system comprising an electric energy storage device that is electrically coupled to the electrical drive, the coupling being such that the electric energy storage device is charged by electric energy generated by the electrical drive in the second operating state and that the electric energy storage device provides stored electric energy to the electrical drive for operating the electrical drive in the first operating state.

In a further embodiment, the electric energy storage device is a battery or a capacitor bank.

In a further embodiment, the electric energy storage device is a lithium polymer battery.

In a further embodiment, the electric motor of the electrical drive is an AC motor, the electric energy storage device being connected to a DC bus of a frequency converter, in particular a variable frequency drive, which is connected between the power source and the AC motor of the electrical drive.

In a further embodiment, the power source comprises a generator, in particular a generator coupled to a gas turbine or a diesel engine.

In a further embodiment, the coupling of the electric energy storage device to the electrical drive comprises a converter, in particular a bi-directional step up or step down converter.

In a further embodiment, the converter is a bi-directional step-up or step-down chopper.

In a further embodiment, the electric energy storage device is coupled to an AC bus of the power supply system, the coupling comprising an inverter and rectifier for converting between an AC voltage on the AC bus and a DC voltage required by the electric energy storage device.

In a further embodiment, the electrical drive of the marine vessel is the drive of a draw works of a drilling rig of the vessel, an anchor winch drive of the vessel or a top drive of a drilling rig of the vessel.

In a further embodiment, the electrical drive is a drive of an active heave compensating draw works of the marine vessel, wherein the first operating state corresponds to a first part of a heave compensation cycle in which the electrical drive consumes electric energy and the second operating state corresponds to a second part of the heave compensation cycle in which the electrical drive generates electric energy, so that the electric energy storage device is periodically charged and discharged during the operation of the active heave compensation.

In a further embodiment, the electric energy storage device is coupled to a DC bus of a frequency converter that is coupled between the power source and the electric motor of the electrical drive, the power supply system further comprising at least a second electric energy storage device coupled to the DC bus, at least a second power source coupled to the DC bus and/or at least a second electrical drive coupled to the DC bus.

In a further embodiment, the electric energy storage device is coupled to a first section of a DC bus of a frequency converter that is coupled between the power source and the electric motor of the electrical drive, the power supply system further comprising at least a second electric energy storage device coupled to a second section of the DC bus, the second section of the DC bus further being coupled to a second power source and at least one second electrical drive, wherein the first and second DC bus sections are connectable by a bus-tie breaker.

In a further embodiment, the electric energy storage device is coupled to a DC bus of a frequency converter that is coupled between the power source and the electric motor of the electrical drive, wherein the DC bus is adapted to be operated in a voltage range of about 300V to about 2000V, and wherein the electrical drives has a power rating in the range of about 100 kW to about 30 MW.

Another embodiment provides a method of operating a power supply system for an electrical drive of a marine vessel, wherein the electrical drive comprises an electric motor that is adapted to receive electric energy from a power source, the power supply system comprising an electric energy storage device that is electrically coupled to the electrical drive, the method comprising the steps of: in a first operating state of the electrical drive, supplying electric energy to the electrical drive for operating the electrical drive, the supplied electric energy comprising electric energy obtained from discharging the electric energy storage device, and in a second operating state of the electrical drive, supplying electric energy generated by the electrical drive when braking or decelerating the electric motor of the electrical drive to the electric energy storage device, wherein the electric energy storage device is charged by the electric energy generated by the electrical drive.

In a further embodiment, the power supply system is configured according to any of the embodiments disclosed above.

BRIEF DESCRIPTION OF THE DRAWINGS

Example embodiments are discussed below with reference to the drawings, in which:

FIG. 3 is a flow diagram of an example method according to an embodiment of the invention.

DETAILED DESCRIPTION

Figure 1:
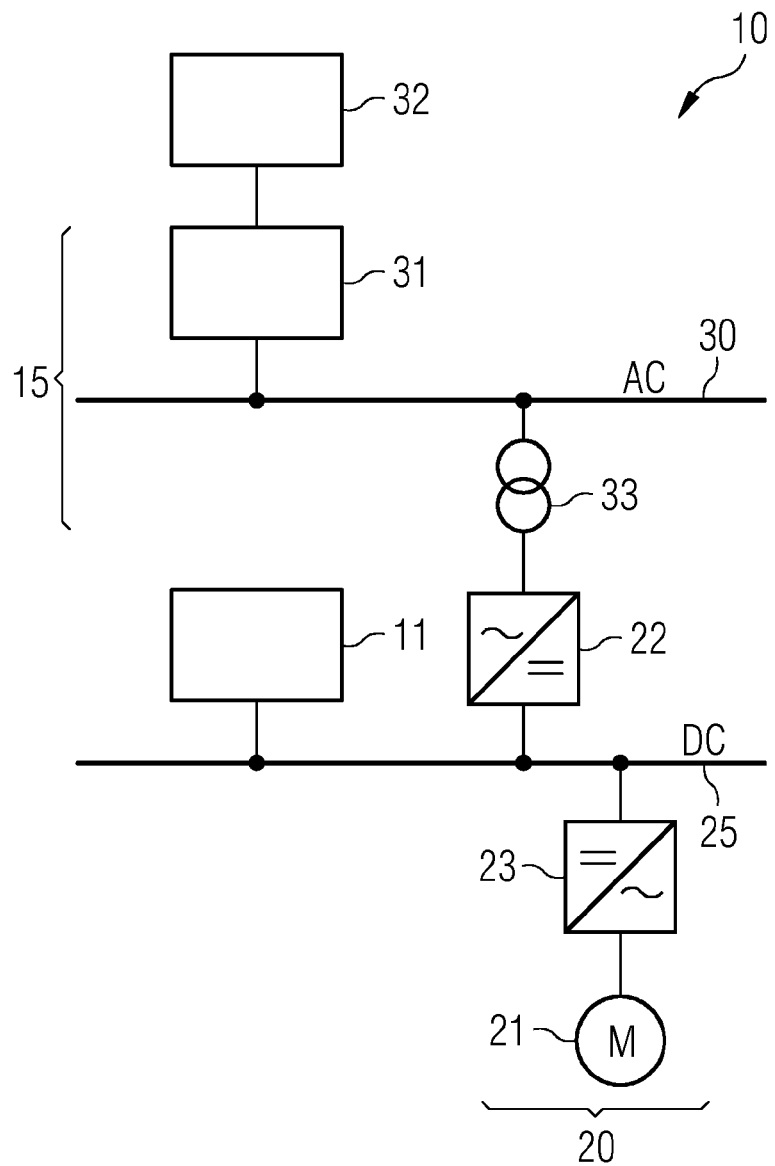
FIG. 1 shows a schematic block diagram of an example power supply system according to one embodiment of the invention.

One embodiment of the invention provides a power supply system for an electrical drive of a marine vessel, wherein the electrical drive comprises an electric motor that is adapted to receive electric energy from a power source. The electrical drive has a first operating state in which electric energy is supplied by the power source to the electrical drive to operate the electrical drive and a second operating state in which the electric motor of the electrical drive is decelerating or braked wherein the electrical drive generates electric energy in the second operating state. The power supply system comprises an electric energy storage device that is electrically coupled to the electrical drive. The coupling is such that the electric energy storage device is charged by electric energy generated by the electrical drive in the second operating state and that the electric energy storage device provides stored electric energy to the electrical drive for operating the electrical drive in the first operating state.

In the first operating state, the operation of the electrical drive may be supported with electric energy from the electric energy storage device, with the remaining electric energy being provided by the (main) power source, or the electrical drive may be fully operated on the electric energy provided by the electric energy storage device (for example during a blackout of the power source or an interruption of the power distribution). By storing the generated electric energy and reusing it for operating the electrical drive, the total energy consumption of the marine vessel may be reduced. Furthermore, the electrical drive may continue to operate for a certain amount of time after a blackout of the main power source. This may for example be beneficial in situations in which a continued operation of the electrical drive is crucial, such as during a drilling operation, so that the main power source can be restored without interrupting the operation. Particularly in active heave compensation applications, where an electrical drive may periodically use and generate electric energy, the power supply system according to the embodiment may achieve substantial energy savings. The electric energy storage device may act as a dampener in the power supply system, thereby avoiding peak loads on the power source, e.g. on the generators. Note that in the second operating state, a situation in which the electric motor is braked does not imply that the rotation speed of the motor decreases. It may also stay constant or increase. The braking can be at least partly applied by extracting electric energy from the electric motor, i.e. by letting the electric motor operate as a generator. Thereby, a braking torque may be applied to the electric motor, irrespective of its speed or speed changes.

In an embodiment, the electric energy storage device may be a battery or a capacitor bank. The electric energy storage device may for example be a lithium polymer battery. Such battery may store substantial amounts of electric energy while only having a relatively small foot print. A lithium polymer battery may have a lower weight and requires less volume, so that savings in weight and required space may be achieved. Furthermore, such type of battery may be maintenance free and may be completely sealed, which has the advantage that no designated battery rooms may be required. The battery may for example be of the type having a nickel manganese cobalt (NMC) oxide cathode.

The battery may have a capacity of at least 100 kWh (kilowatt hours), preferably of at least 500 kWh, more preferably of at least 2000 kWh. The capacity of the battery may be dimensioned in accordance with the type of electric drive and the time span that it is supposed to bridge. The capacity of the battery may for example lie in the range of about 50 kWh to about 5 MWh. If the electric drive is for example a drilling drive, an electrical energy of 1-3 MWh (megawatt hours) may be provided. As an example, two batteries each having a capacity of 1.5 MWh may be provided for such case.

The battery may be a bank or a stack of smaller battery modules. For example modules each having capacity of 5 to 50 kWh may be used. The capacity of the battery can then be adapted by providing the required number of battery modules.

The battery may have an energy density of at least 130 Wh/kg (watt hours per kilogram), preferably of at least 150 Wh/kg.

This has the advantage that the footprint and the weight of the battery can be kept small.

The battery may be a fully sealed battery.

In an embodiment, the battery is provided with a battery management system adapted to monitor the state of the battery and with an interface towards a control bus for enabling a communication with the battery management system. The control bus may for example be a controller area network (CAN) based bus. The state of the battery may thus be monitored from a Drives controller in the VFD switchboard or remote location, such as the vessel's bridge. The battery management system may furthermore balance the cells of the battery. It may perform cell balancing of cells in a battery module or balance the battery modules among themselves. Accordingly, it becomes possible to connect multiple battery modules in parallel or in series. The battery management system may furthermore supervise and control the charging of the battery.

In an embodiment, the motor of the electrical drive may be an alternating current (AC) motor, the electric energy storage device being connected to a direct current (DC) busbus of a frequency converter, which is connected between the power source and the AC motor of the electrical drive. The frequency converter may for example be a variable frequency drive (VFD), which may also be termed variable speed drive (VSD). Connecting the electric energy storage device to the DC busbus may facilitate the charging and discharging of the electric energy storage device. The power supply system may comprise the frequency converter. The frequency converter may have a rectifier, an inverter and a DC bus coupling the rectifier to the inverter. The power supply system may comprises the rectifier, the DC-bus and/or the inverter.

The power source may comprise a generator. In particular, it may comprise a generator coupled to a gas turbine or a diesel engine. The power source may be part of the power supply system.

The coupling of the electric energy storage device to the electrical drive may comprise a converter. This may for example be a bi-directional step-up or step-down converter. By using such converter, the voltage required by the electric energy storage device may be adapted to the voltage at which the direct current (DC) busbus or any other busbus towards which the storage device is coupled is operated.

The converter may for example be a bi-directional step-up or step-down chopper.

In another embodiment, the electric energy storage device may be coupled to an AC (alternating current) busbus of the energy supply system. This may for example be an AC busbus that is used to transport electric energy between the power source and the frequency converter. The coupling to the AC busbus may comprise an inverter and rectifier for converting between the AC voltage provided on the AC bus and a DC voltage required by the electric energy storage device.

In an embodiment, the electrical drive of the marine vessel may be the drive of a draw works of a drilling rig of the vessel, an anchor winch drive of the vessel, or a top drive of a drilling rig of the vessel. The draw works may be an active heave compensating draw works. In any of these applications, power savings may be achieved by the power supply system. Further, the continued operation of the respective drive during a blackout of the main power source may be achieved.

The electrical drive may for example have a power rating in a range of about 100 kW to about 20 MW. Thruster drives may for example have a power rating in the range of 500 kW to about 6 MW. For a drilling drive, the power rating of all electrical drives may for example lie within a range of about 1 MW to about 30 MW. Note that the electrical drive will generally comprise more than one electric motor.

The electrical drive may for example be a drive of an active heave compensating draw works of the marine vessel. The first operating state may correspond to a first part of a heave compensation cycle in which the electrical drive consumes electric energy. The second operating state may correspond to a second part of the heave compensation cycle in which the electrical drive generates electric energy. The electric energy storage device may thus be periodically charged and discharged during the operation of the active heave compensation, i.e. during the subsequent heave compensation cycles.

The active heave compensating draw works may for example comprise one or more electric motors. It may comprise winch drum which is rotated by the one or more electric motors and on which a drill line is reeled up. The heave compensating draw works may be adapted so as to raise and lower a drill string by paying in and paying out, respectively, drill line. In the first part of the heave compensation cycle, the draw works may reel in drill line so as to raise the drill string (e.g. when the vessel moves through a wave trough, wherein electric energy is consumed. It may lower the drill string during the second part of the heave compensation cycle by reeling out drill line (e.g. when moving up to a wave crest), wherein electric energy can be produced by breaking the electric motors. In particular, the electric motor is rotated by means of the load on the drill line, thereby functioning as a generator.

The electric energy storage device may thus act as a buffer for the generated electric energy when the drill string is raised and lowered during heave compensation as a result of the marine vessel being lowered or lifted by the sea waves, respectively.

The electric energy storage device may be coupled to a DC bus of a frequency converter that is coupled between the power source and the electrical drive. The power supply system may further comprise at least a second electric energy storage device coupled to the DC bus, at least a second power source coupled to the DC bus and at least a second electrical drive coupled to the DC bus. A common DC bus may thus be used in the operation of plural electrical drives, and plural electric energy devices may be provided for buffering generated electric energy.

In an embodiment, the electric energy storage device may be coupled to a first section of a DC bus of a frequency converter that is coupled between the power source and the electrical drive. The power supply system may further comprise at least a second electric energy storage device coupled to a second section of the DC bus, the second section of the DC bus further being coupled to a second power source and at least one second electrical drive, wherein the first and second DC bus sections may be connectable by a bus tie breaker. Two independent power supplies may thus be provided, wherein the independent power supplies may be separated by means of the bus tie breaker. An undisturbed operation of one of these power supply systems may thus be ensured in case of a blackout in the other power supply system. The bus tie breaker may for example be a manual No Load Switch, an IGBT based intelligent breaker or a bus bar breaker.

The power supply system may further comprise a braking resistor, which may for example be coupled to a DC bus, e.g. via a braking chopper. Access energy generated by the electrical drive may thus be burned off in the braking resistor, for example electric energy that may exceed the capacity of the electric energy storage device.

The DC bus may be adapted to be operated in a voltage range of about 300 V to about 2.000 V. Preferably, the DC bus may be adapted to operate at an operating voltage between about 800 V and about 1100 V. The DC bus may for example supply 900 or 930 V.

In a further embodiment, the power supply system may comprise the power source and a frequency converter that is part of the electrical drive, the frequency converter being connected between the power source and the electric motor, the electric motor being an AC motor, wherein the AC motor is drivable at variable speed by means of the frequency converter. The energy storage device may be connected to a DC bus of the frequency converter. The power supply system may in some embodiments comprise the AC motor.

A further embodiment provides a method of operating a power supply system for electrical drive of a marine vessel. The electrical drive comprises an electric motor that is adapted to receive electric energy from a power source. The power supply system may comprise an electric energy storage device that is electrically coupled to the electrical drive. In a first operating state of the electrical drive, the method comprises supplying electric energy to the electrical drive for operating the electrical drive, the supplied electric energy comprising electric energy obtained from discharging the electric energy storage device. In a second operating state of the electrical drive, electric energy generated by the electrical drive when braking or decelerating the electric motor of the electrical drive is supplied to the electric energy storage device, wherein the electric energy storage device is charged by the electric energy generated by the electrical drive.

With the method of the embodiment, advantages similar to the ones outlined above with respect to the power supply system may be achieved.

In an embodiment, the method is performed by means of a power supply system that is configured as outlined above.

The features of the embodiments mentioned above and of those to be explained below can be combined with each other unless noted to the contrary.

In the following, the embodiments illustrated in the accompanying drawings are described in more detail. It should be clear that the following description is only illustrative and non restrictive. The drawings are only schematic representations, and elements in the drawings are not necessarily to scale with each other. Functional blocks or units shown in the drawings do not necessarily imply that these are to be implemented in a single physical unit, block, circuit, chip or the like, but a single functional block or unit may be implemented in several physically separate units, while two or more separately illustrated functional blocks or units may be implemented in a single physical unit.

It should be noted that the direct coupling between two blocks, units, elements or the like shown in the drawings may also be implemented as an indirect coupling, i.e. a coupling with intervening elements. These may for example be control elements, protective elements such as fuses or circuit breakers or the like.

FIG. 1 is a schematic block diagram showing a power supply system 10 for an electrical drive 20 of a marine vessel. In the example of FIG. 1, the electrical drive 20 comprises an electric motor 21 and a variable frequency drive (VFD, also termed variable speed drive, VSD). The variable frequency drive comprises a rectifier 22 via which it is coupled to the AC (alternating current) power source 15, an intermediate DC circuit, here a DC bus 25, and an inverter 23. In other configurations, the DC bus 25 may be coupled via more than one rectifier, e.g. via two, three, four or more rectifiers, to the power source 15. Similarly, the DC bus 25 can be coupled to the electric motor 21 via more than one inverter 23, e.g. via two, three, four or more inverters. In other embodiments, the electrical drive 20 may comprise a DC electric motor, and may thus not comprise a VSD.

In the example of FIG. 1, the AC power source 15 comprises a generator 31, an AC bus 30 and a transformer 33. Although FIG. 1 only shows a single phase AC power source, it should be clear that the AC power source 15 may be a three phase AC power source. The generator 31 may for example be driven by a diesel engine or a gas turbine 32 or the like.

The power source 15 is the main power source for operating the electrical drive 20. In case of a blackout of power source 15, the electrical drive 20 does no longer obtain electric energy and thus ceases operation. In a hoisting application, the hoisting thus has to be stopped and brakes need to be applied to the rotating motor 21. A magnetized motor that is being rotated by an overhauling load may function as a generator and may accordingly generate electrical energy that is fed back into the DC bus 25 (which may also be termed DC intermediate circuit). In a conventional system, the voltage on the DC bus 25 has to be controlled, which is generally performed by means of a breaking chopper. The breaking chopper can be activated if the voltage on the DC bus exceeds a predefined threshold voltage above which the braking copper connects a braking resistor to the DC bus. The braking resistor converts the electric energy into heat and for larger amounts of energy thus requires cooling. Accordingly, such braking resistors can be relatively large in size, they require relatively large amount of space and are expensive.

In the embodiment of FIG. 1 the power supply system 10 comprises an electric energy storage device 11 that is coupled to the DC bus 25. If the electrical drive 20 now generates electric energy, this energy can be supplied to the electric energy storage device 11 and can be stored therein. Energy storage device 11 may be connected permanently to DC bus 25 so as to operate as a buffer for electric energy. If electrical drive 20 generates electric energy and the voltage on the DC bus 25 thus rises, the electric energy storage device 11 can be charged whereas if drive 20 is under heavy load, the voltage level on the DC bus 25 is lowered, in response to which the electric energy storage device 11 can be discharged. Voltage on DC bus 25 can thus be kept more constant. Furthermore, the storage device 11 supports the main power source 15 in supplying electrical energy to the drive 20, so that by reusing the generated electric energy, the total electric energy consumption can be reduced. This results in diesel engine or gas turbine 32 requiring less fossil fuel.

There are different ways in which the energy storage device 11 can be coupled to DC bus 25. One possibility is a bidirectional converter 12 which adapts the voltage provided on DC bus 25 to the voltage required by electric energy storage device 11. The converter may for example be implemented by a bidirectional (step-up/step-down) chopper. Other implementations of the coupling to the DC bus 25 are certainly also conceivable, e.g. by a power electronic switch which connects the storage device 11 to the DC bus above a certain voltage level for charging or below a certain voltage level for discharging and disconnects the storage device 11 during normal operation.

It should be noted that the electric energy storage device 11 may also be coupled to the power supply system 10 at locations different to the one illustrated in FIG. 1. The power source 15 may for example be part of the power supply system 10, and the electric energy storage device 11 may be coupled to the AC bus 30 of the power source 15. The coupling between the electric energy storage device 11 and the AC bus 30 may then comprise an inverter/rectifier in order to enable the discharging/charging respectively, of the storage device 11.

Electric energy storage device 11 may for example be a battery, in particular a lithium polymer battery. The battery may for example comprise a battery bank with a plurality of battery modules which are connected in series or in parallel. The voltage at which the battery is rated may then be adjusted by the number of battery modules connected in series, whereas the total capacity of the battery can be determined by the number of battery modules connected in parallel.

The voltage at which the battery is rated can for example be adapted to the voltage provided on the DC bus 25. For the applications mentioned above, the DC bus may for example operate at voltages between 500 Volts and 1200 Volts. A particular application would for example be a Voltage of 930 Volts, which is obtained by rectifier 22 from a 3-phase AC voltage of 690 Volts provided by the main power source on AC-bus 30. Battery 11 may comprise a battery management system (BMS) which controls the charging of the battery modules of battery 11.

The capacity of battery 11 is configured in accordance with the particular requirements, in particular with the amount of electric energy that is expected to be generated by electric motor 21. Battery capacity can be increased by connecting further battery modules in parallel in the battery bank. The capacity of battery 11 may for example be at least 100 kWh (kilowatt hours), preferably at least 500 kWh. Preferably, the capacity lies in a range between about 100 kWh and 3 MWh (megawatt hours). For applications with higher power drives, such as drilling drives, the battery 11 may have a capacity of between 1-3 MWh. As an example, battery 11 may comprise two battery banks each having a capacity of 1.5 MWh. Higher capacities can be achieved by providing further battery banks (i.e. connecting more electric energy storage devices 11 to DC bus 25) or by increasing the capacity of each bank.

Battery 11 is preferably a lithium polymer battery. There are different types of lithium polymer batteries, and one type that may be used is the NMC type which comprises a nickel manganese cobalt (NMC) oxide cathode. The use of other types of lithium polymer batteries or different batteries at all is certainly also conceivable. The battery may be configured to have an energy density of at least 130 Wh/kg (Watt hours per kilogram), or even at least 150 Wh/kg. By providing a battery with such energy densities, the weight of the battery for a particular capacity can be reduced significantly. The volume energy density is preferably at least 300 Wh/l (Watt hours per liter). By using a battery with such high volume energy density, the battery can be very compact even if providing a high capacity. A battery with a capacity of 1 MWh may thus require only a volume of approx 3 m$^3$. The small volume and the small weight of the battery even at higher capacities enable the use of the battery on a marine vessel, on which space and the capacity for taking up additional weight are strictly limited.

The battery is fully sealed. As such, the battery is maintenance free. As it is fully sealed, the battery does not require special battery rooms or special considerations related to ventilation. Furthermore, such batteries can have a lifecycle of up to 25 to 30 years. As lithium polymer batteries have a solid polymer as an electrolyte, they are furthermore less dangerous than conventional lead-acid batteries, and thus particularly advantageous under the aspect of onboard safety of the marine vessel.

The battery is preferably provided with a battery management system (not shown). Battery modules of battery 11 may for example each comprise a number of battery cells and BMS circuitry which for example controls cell balancing. Each module may furthermore comprise an interface to a data bus, e.g. a CAN-based data bus, which allows communication with the BMS of each module. Battery 11 may comprise the interconnected battery modules forming the battery bank, as well as a master controller connected via the data bus to each of the battery management systems of the individual modules. The master controller may then control the overall operation of the battery bank. It may for example ensure a uniform charging and a discharging of the individual battery modules, or may connect and disconnect the overall battery bank from the load. This may for example be necessary in order to stay below the rated maximum discharge rate. By interfacing the master controller of the battery management system, it is further possible to obtain information about the overall state of the battery 11 and to control the charging or discharging of the battery from an external control center.

Besides using the above mentioned battery as an electric energy storage device 11, it is also possible to use a capacitor bank for energy storage. Preferably, electrolytic capacitors are used in such capacitor bank. Compared to the capacitor bank, the above mentioned battery has the advantage that it is more compact.

Power supply system 10 may supply electric power to different types of electrical drives 20. Electric motor 21 may have a power rating in a range between about 100 kW to about 3 MW, and preferably from about 250 kW to about 1.500 kW. Electrical drive 20 may for example drive one of the following: the draw works of a drilling rig, the top drive, a mud pump, an anchor winch, or of any other type of hoisting application. Providing the electric energy storage device 11 as particular advantageous in an active heave compensated draw works.

An active heave compensator is generally adapted to compensate for a heave motion of the marine vessel caused by sea waves. A heave compensation cycle may comprise a first part (or phase) in which the vessel drops into a wave trough, in response to which the draw works needs to raise a drill string, thereby consuming electric energy. In a second part of the heave compensation cycle, the marine vessel is raised to the crest of a wave, in response to which the draw work needs to lower the drill string, whereby the electric motors of the drive of the draw works need to be braked, thereby generating electric energy. Note that electric energy may only be generated during a part of the second phase of the heave compensation cycle, for example when the movement of the drill string relative to the marine vessel is being slowed down.

The electrical drive of such drawworks may comprise more that one electric motor 21, e.g. four or even more electric motors. These motors may be driving a common shaft on which a spool for reeling in and out the drill line is mounted. The drill line can be used to raise and lower a traveling block to which the drill string is attached. In active heave compensation, the drill line is reeled in and out periodically with the periods of the waves hitting the marine vessel so that the vertical motion of the marine vessel relative to the seabed is compensated for and an almost constant weight on bit is achieved. The period of a heave compensation cycle may for example lie within a range of about 7 to about 15 seconds.

In the two phases of the heave compensation cycle, electric energy is alternating by being generated and being consumed by the electrical drive 20. Electric energy storage device 11 thus provides a buffer which stores the generated electric energy and feeds it back to the drive 20, thereby reducing the peak load on the main power source 15 and the total energy consumption. The storage device 11 thus acts as a dampener in the power supply system 10.

Although not shown, the power supply system 10 may furthermore still comprise a braking resistor that may be coupled by means of a braking chopper to DC bus 25. This may be provided as a safety backup in case the electric energy storage device 11 is fully charged and can thus not absorb more electric energy. This additional electric energy may then be burned in the backup braking resistor.

Note that besides the energy storage device 11, further components illustrated in FIG. 1 may be considered to be part of embodiments of the power supply system 10, in particular components that are used to supply electric energy from power source 15 to the electric motor 21, such as rectifier 22, DC bus 25 and inverter 23. Power supply system 10 may thus comprises components of the VFD. Power source 15 may also be part of the power supply system 10.

Figure 2:
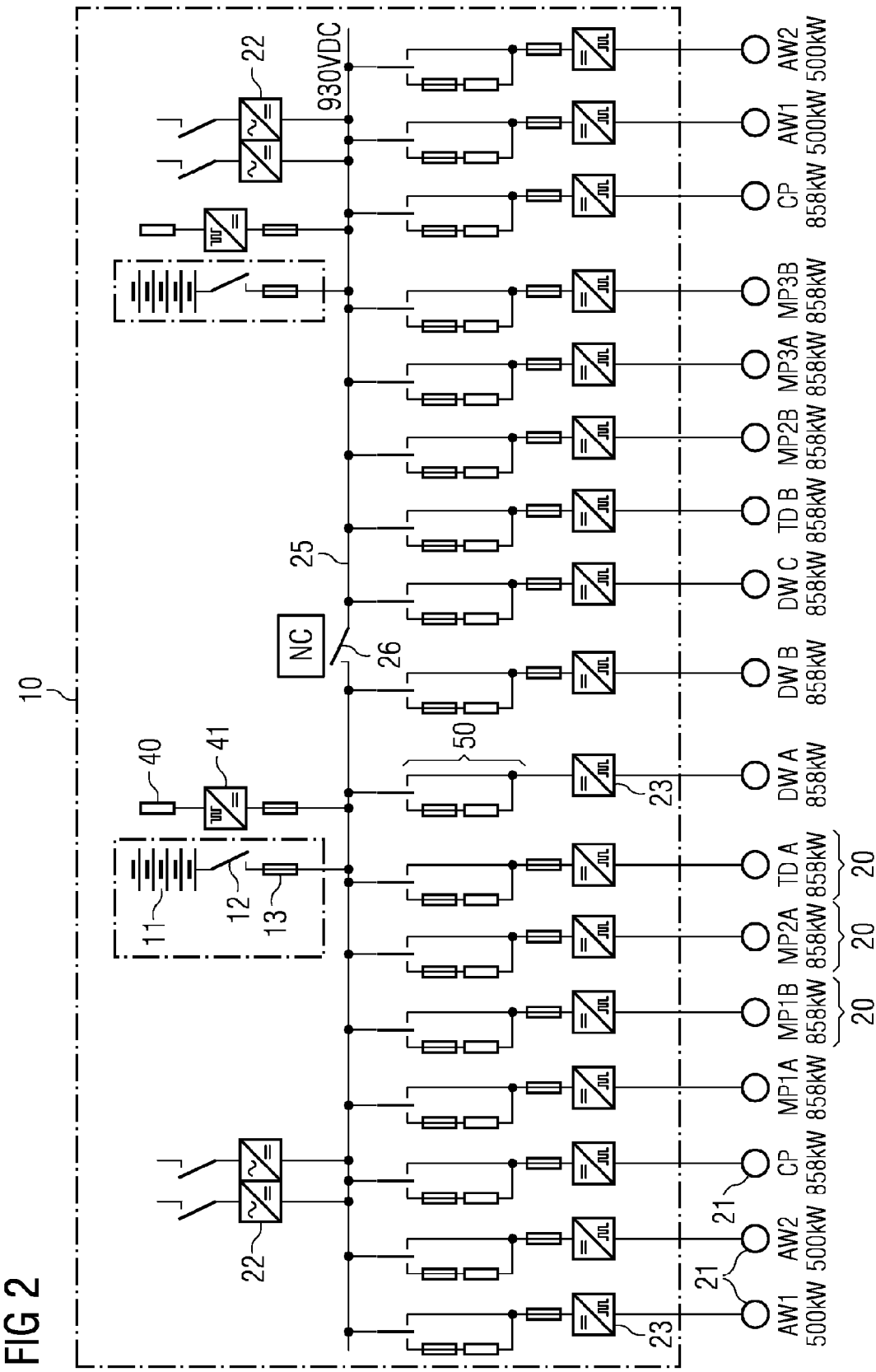
FIG. 2 shows a schematic block diagram of an example power supply system according to another embodiment of the invention.

FIG. 2 illustrates a particular implementation of the system shown in FIG. 1 in which several electrical drives 20 are supplied with electric power by the power supply system 10. The electrical drives include drives for draw works (DW), anchor winch drives (AW), top drives (TD), drives for a mud pump (MP), for each of which an exemplary power rating is indicated in the figure. It should be clear that the marine vessel may comprise a different number of electrical drives 20 and that these drives may have different power ratings.

In the example of FIG. 2, each electrical drive 20 comprises a circuit 50 using which the respective inverter 23 and the electric motor 21 are coupled to DC bus 25. Circuit 50 is a pre-charging circuit that is used to pre-charge the capacitors in the inverter 23. For this purpose, circuit 50 can connect inverter 23 to DC bus 25 via a resistor which allows a charging of the capacitors at startup of the drive. In operation, the inverter 23 is directly coupled to DC bus 25.

DC bus 25 is operated at 930 V DC in the example of FIG. 2, although it should be clear that in other applications, it may be operated at different voltages. As can be seen, a plurality of drives 20 are connected to DC bus 25. For the purpose of redundancy and for preventing a propagation of faults, a bus tie breaker 26 is provided. As indicated, bus tie breaker 26 operates in a normally closed (NC) condition. In certain operating conditions, the bus tie breaker 26 may need to be opened.

In the example of FIG. 2, the electric energy storage device 11 is a battery. The battery is coupled to DC bus 25 via the bidirectional chopper 12 and a fuse 13. As indicated in the figure, fuses may be provided at further positions in the circuitry.

The main power source (not shown) is coupled to DC bus 25 via the rectifiers 22. In FIG. 2, four rectifiers are provided, although it should be clear that the power supply system 10 may comprise any other number of rectifiers.

Power supply system 10 in the embodiment of FIG. 2 further comprises a braking resistor 40, which is coupled to DC bus 25 by means of braking chopper 41 and a fuse. As mentioned above, braking resistor 40 may be used for burning up excess electric energy which can not be taken up by battery 11.

To each section of the DC bus 25, which is separable by the bus tie breaker 26, a battery 11 is coupled. Accordingly, even in an operating condition in which the bus tie breaker 26 is open, electric energy generated by the drives 20 can be stored in the respective battery 11. Note that more than one battery 11 may be coupled to a particular section of DC bus 25.

For each section of DC bus 25, the respective battery 11 may be dimensioned so that the electric energy that is expected to be generated during any operation condition can be taken up. It may for example have a capacity that is capable of taking up the amount of electric energy generated during active heave compensation up to a certain wave height.

It should be clear that FIG. 2 illustrates a particular implementation of the power supply system 10 outlined further above with respect to FIG. 1. Accordingly, all the explanations given above with respect to FIG. 1 are equally applicable to the system illustrated in FIG. 2. Furthermore, it should be clear that the power supply system 10 of FIG. 2 may in other embodiments only comprise the components 11-13, with the rectifiers 22, DC-bus 25, circuits 50 and inverters 23 being part of the VFD of the respective electrical drive 20.

By providing the electric energy storage device 11, the power supply system is thus capable of reducing the energy consumption by reusing the generated electric energy, thus resulting in a reduced consumption of fossil fuels, such as diesel or gas used by a diesel engine or gas turbine, respectively, for driving the generator 32.

FIG. 3 shows a flow diagram of a method according to an example embodiment of the invention which may be performed by means of the power supply system 10 described above with respect to FIG. 1 or 2. In a first step 101, electric energy is supplied from the main power source 15 to the electrical drive 20. The electrical drive is operated using the supplied electric energy in step 102, e.g. for lifting a load, such as the drill string during active heave compensation. In step 103, the electrical drive is operated to lower the load, such as lowering the drill string during active heave compensation. Electric energy that is generated by the electrical drive 20 during the lowering of the load is supplied in step 104 to the electric energy storage device 11. The electric energy storage device is charged with the supplied electric energy (step 105).

In step 106, electric energy stored at the electric energy storage device and/or electric energy from the main power source is supplied to the electrical drive 20. The electrical drive may be operated only on energy supplied by the main power source, e.g. when the electric energy storage device is empty discharged. In case of a blackout of the main power source, the electrical drive 20 may be operated for a certain amount of time only from energy supplied by the electric energy storage device 11. In other configurations, for example during active heave compensation or when hoisting a load, energy may be supplied by both the main power source and the electric energy storage device, thereby reusing the stored electrical energy and lowering the load on the main power source.

The electrical drive may for example be operated to lift a load using at least partially the electric energy provided by the electric energy storage device (step 107). In an active heave compensation application, or in repeated lifting applications, the steps 103 to 107 may be repeated during the operation of the electrical drive (step 108).

It should be clear that some of the steps shown in FIG. 3 and explained above are optional, such as steps 107 and 108.

By making use of embodiments disclosed in the present application, the electric energy consumption of a marine vessel may be reduced. The invention is not restricted to a particular type of electrical drive. It may in particular be used with drilling drives, such as top drives, the drive of draw works, anchor winch drives, and the like. Besides reducing energy consumption and lowering the load on the generators, the electric energy storage device further allows a continued operation of the respective drive in case of a blackout of the main power source, so that a particular operation, such as a hoisting operation or the like, may be completed or that an auxiliary power source may be brought on line or the main power source may be restored.

What is claimed is:

1. A power supply system for compensation for heave of a marine drilling vessel, the power supply system comprising:
   a main power source;
   an electric energy storage device coupled to the main power source via a DC bus; and
   an electric motor/generator electrically coupled via the DC bus to the main power source and the electric energy storage device,
   wherein the electric motor/generator is configured to receive electric energy from one or more of the main power source and the electric energy storage device to operate the electric motor/generator as a motor in a first operating state when the marine vessel lowers to a wave trough,
   wherein the electric motor/generator is configured to charge the electric energy storage device to operate as a generator in a second operating state when the marine vessel rises to a wave crest; and
   wherein the electric motor/generator is an electrical drive of at least one or more of a marine active heave compensating draw works, a draw works of a marine drilling rig, a marine anchor winch drive, and a top drive of a marine drilling rig.

2. The power supply system according to claim 1, wherein the electric energy storage device comprises at least one or more of a battery and a capacitor bank.

3. The power supply system according to claim 1, wherein the electric energy storage device comprises a lithium polymer battery.

4. The power supply system according to claim 1, wherein the electric motor/generator of the electrical drive comprises an AC motor, wherein the bus comprises an AC bus and a DC bus, wherein the electric energy storage device is connected to the DC bus, and a variable frequency drive is connected between the power source and the AC motor of the electrical drive.

5. The power supply system according to claim 1, wherein the power source comprises a generator coupled to one or more of a gas turbine and a diesel engine.

6. The power supply system according to claim 1, wherein the coupling of the electric energy storage device to the electrical drive comprises a bi-directional step up or step down converter.

7. The power supply system according to claim 6, wherein the converter is a bi-directional step-up or step-down chopper.

8. The power supply system according to claim 1, wherein the power supply system comprises an AC bus, wherein the electric energy storage device is coupled to the AC bus, the coupling comprising an inverter and rectifier for converting between an AC voltage on the AC bus and a DC voltage required by the electric energy storage device.

9. The power supply system according to claim 1, wherein:
   the system further comprises a frequency converter that is coupled between the power source and the electric motor/generator of the electrical drive, the frequency converter having a DC bus,
   the electric energy storage device is coupled to the DC bus, and
   the power supply system further comprises at least one of a second electric energy storage device coupled to the DC bus, a second power source coupled to the DC bus and a second electrical drive coupled to the DC bus.

10. The power supply system according to claim 1, wherein:
    the system further comprises a frequency converter that is coupled between the power source and the electric motor/generator of the electrical drive, the frequency converter having a DC bus,
    the electric energy storage device is coupled to a first section of a DC bus, and
    the power supply system further comprises at least a second electric energy storage device coupled to a second section of the DC bus, the second section of the DC bus further being coupled to a second power source and at least one second electrical drive,
    wherein the first and second DC bus sections are connectable by a bus-tie breaker.

11. The power supply system according to claim 1, wherein:
    the electric energy storage device is coupled to a DC bus of a frequency converter that is coupled between the power source and the electric motor/generator of the electrical drive,
    the DC bus is adapted to be operated in a voltage range of about 300V to about 2000V, and
    the electrical drives has a power rating in the range of about 100 kW to about 30 MW.

12. A method of operating a power supply system for compensation for heave of a marine drilling vessel, the method comprising:
    compensating for heave of the marine vessel by an electric motor/generator, wherein the electric motor/generator is an electric drive of at least one or more of a marine active heave compensating draw works, a draw works of a marine drilling rig, a marine anchor winch drive, and a top drive of a marine drilling rig;
    supplying power to the electric motor/generator from one or more of a main power source and an electric energy storage device, wherein the electric motor/generator is coupled via a DC bus to the main power source and the electric energy storage device, wherein the electric motor/generator is configured to receive electric energy to operate the electric motor/generator as a motor in a first operating state when the marine vessel lowers to a wave trough;
    storing power to the electric energy storage device from the electric motor/generator; wherein the electric motor/generator is configured to charge the energy storage device to operate as a generator in a second operating state when the marine vessel rises to a wave crest.

13. A marine vessel comprising:
    An electric drive of one or more of a marine active heave compensating draw works, a draw works of a marine drilling rig, a marine anchor winch drive, and a top drive of a marine drilling rig, wherein the electrical drive comprises an electric motor/generator;
    a main power source comprising a generator coupled to one or more of a gas turbine and a diesel engine; and
    an electric energy storage device comprising at least one or more of a battery and a capacitor bank;
    wherein the electric motor/generator is electrically coupled via a DC bus to the main power source and the electric energy storage device,
    wherein the electric motor/generator is configured to receive electric energy from one or more of the main power source and the electric energy storage device to operate the electric motor/generator as a motor in a first operating state when the marine vessel lowers to a wave trough, and wherein the electric motor/generator is configured to charge the electric energy storage device to operate as a generator in a second operating state when the marine vessel rises to a wave crest.

\* \* \* \* \*